June 4, 1929.  A. E. WINCKLER  1,716,020
MOTOR
Original Filed March 8, 1923    2 Sheets-Sheet 2
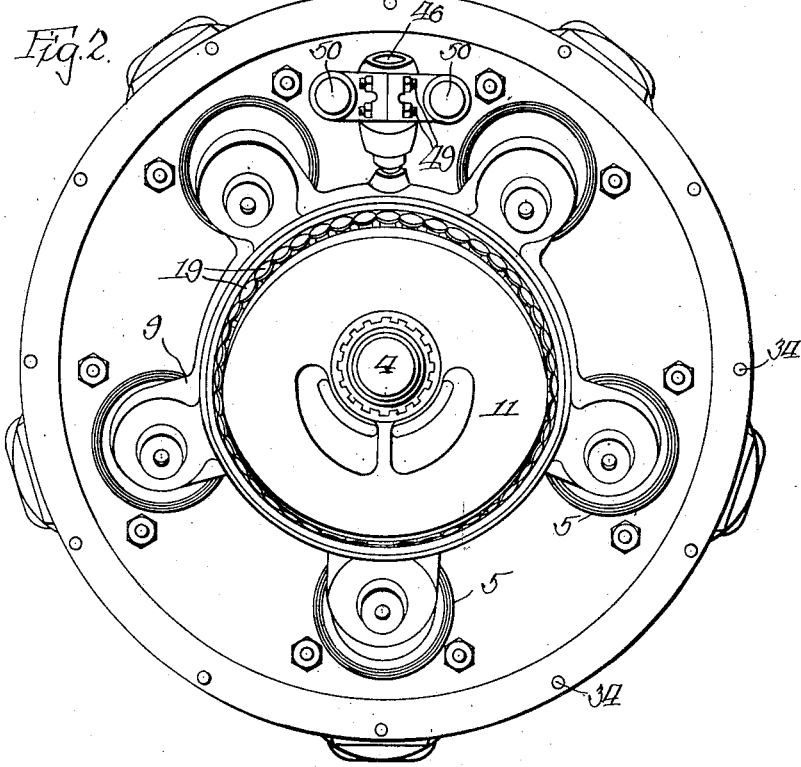
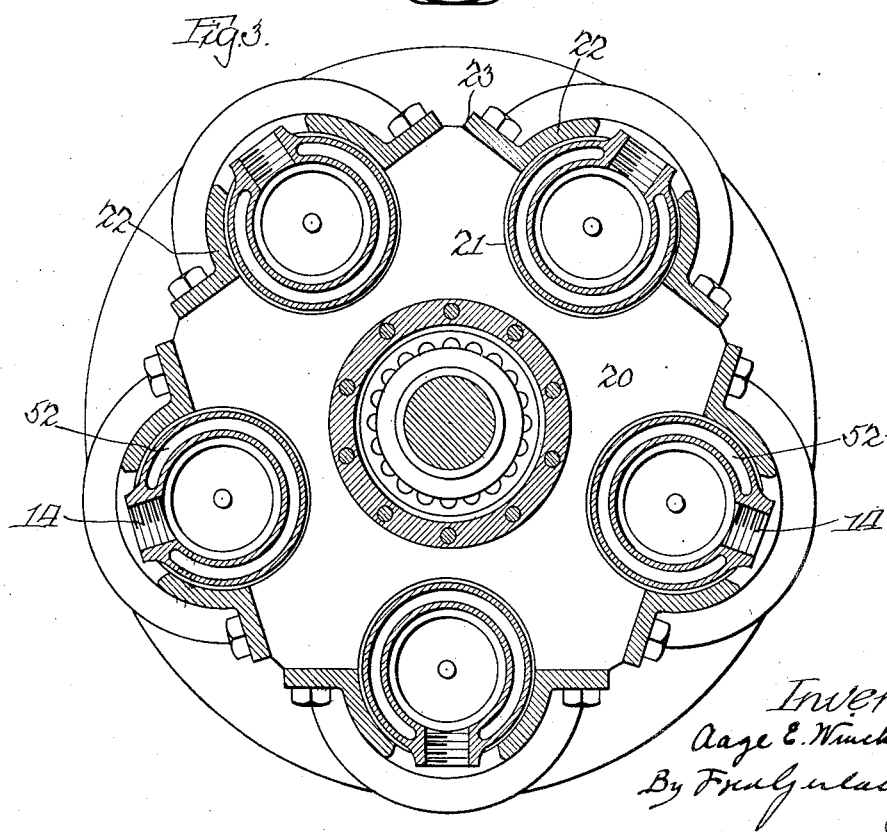

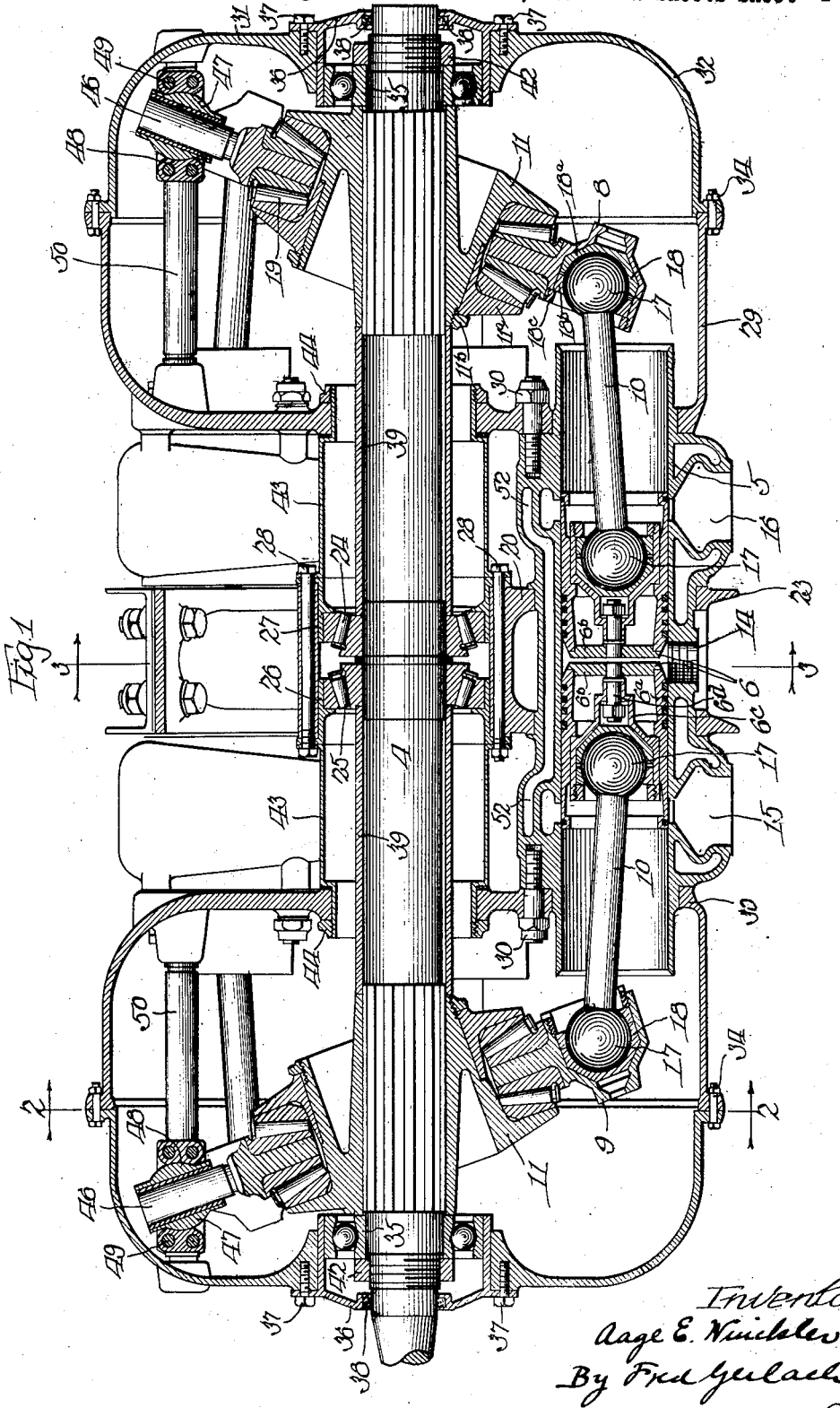

Patented June 4, 1929.

1,716,020

UNITED STATES PATENT OFFICE.

AAGE E. WINCKLER, OF MILWAUKEE, WISCONSIN.

MOTOR.

Application filed March 8, 1923, Serial No. 623,572. Renewed August 17, 1928.

The invention relates to motors. Desiderata in motor construction are to minimize the weight of the motor in its entirety and to eliminate vibration to the greatest possible extent. In motors used for aeroplanes and for other purposes, it is particularly advantageous to eliminate as much weight as possible from the motor without sacrificing efficiency.

In the present invention, these objects are attained by constructing a motor in which minimum piston-thrust and power-stresses are applied to the motor-casing or supporting structure and such thrust and stresses are mainly applied to, and longitudinally of, and equalized on the motor-shaft. By providing a motor in which the reactional stresses are longitudinal of and equalized upon the shaft, it becomes possible to very materially reduce the weight of the supporting structure or casing, since it is not necessary to build it so as to withstand the usual power stresses.

Another object of the invention is to provide an improved motor which is simple in construction, efficient in operation and can be produced at a low cost.

The invention consists in the several novel features hereinafter set forth and more particularly defined by claims at the conclusion hereof.

In the drawings: Fig. 1 is a longitudinal section of a motor embodying the invention. Fig. 2 is a section on line 2—2 of Fig. 1. Fig. 3 is a section taken on line 3—3 of Fig. 1.

The invention is exemplified in a motor comprising a shaft 4, a series of cylinders 5 arranged around, and with their axes parallel to the shaft, a pair of oppositely working pistons 6 in each cylinder, a pair of wobble-rings 8 and 9, disposed adjacent the ends of the cylinders respectively, pitmen 10 each connecting one of the pistons and one of said rings, and heads 11 fixed to ends of the shaft 4, each provided with an annular groove having its axis oblique to the axis of the shaft 4 and into which the wobble-rings extend. Roller-bearings 19 are interposed between the head and the wobble-rings to minimize resistance of the heads to their rotation by the longitudinal power-stresses applied to and through said rings. Each cylinder is provided with an intake port 14 for fuel or motive agent and with exhaust ports 15 and 16 for the escape of the products of combustion or spent motive agent. One end of each pitman is connected to a piston by a universal joint consisting of a ball 17 on the pitman and a socket 18 in which the ball is confined so that it can rotate in the socket and so that the sockets and balls will move together approximately longitudinally of the pitman, and the other end of each piston is similarly connected to one of the wobble-rings. Each socket comprises sections $18^a$—$18^b$ and a screw-threaded adjusting-collar $18^c$ for keeping the sections tight against the balls and for taking up wear. Each piston is shown as made up of a cylindrical body $6^a$ of light metal, such as aluminum, and in which the usual piston-rings are held, a head $6^b$ of hard metal, such as iron, an inner socket or liner $6^c$ of hard metal, and a bolt $6^d$ which clamps the liner and head together. The ball-socket for the pitman is held in the liner. Each driving head 11 is formed with a section $11^a$, removably held on the head by a screw-threaded collar $11^b$, whereby the roller-bearings 19 may be adjusted and which permits removal and replacement of the bearing on the head. The groove in one driving head and wobble-ring is oppositely inclined relatively to the other ring and groove, so that the longitudinally aligned portions of the rings will always operate in opposite directions and so the driving stresses applied through them to opposite ends of the shaft will be opposed to each other and thus substantially equalized on the shaft itself.

The motor casing comprises a central member or head 20 which is provided with peripheral semi-cylindrical seats 21 for the cylinders 5 respectively which are rigidly secured to said head and in said seats by caps 22 which are bolted to said head, as at 23. Roller-bearings 24 and 25 between the central portion of the motor-shaft and adjustable annular bearing-ring carriers 26 and 27, which are secured to head 20 by bolts 28, are inclined relatively to the axis of the shaft and serve as end-thrust bearings for shaft 4 which permit relative expansion and contraction of the shaft and cylinders and prevent endwise movement in either direction of the shaft 4 when it is subjected to end-thrust, as, for example, in an aeroplane motor. The casing also comprises a housing at either end of the motor-shaft for enclosing the wobble-rings and associated parts. Each of said housings comprises an inner section 29 into which the ends of the cylinders 5 extend. Each section 29 is secured to the cylinders by bolts 30. Each of said housings also comprises an outer section 31 which is secured by bolts 34 to the outer ends of section 29. Each end of shaft 4 is journalled in a ball-bearing 35 which is removably and slidably retained in a head 36 which is secured by bolts 37 to a housing section 31. Ball-bearings 35 are slidable in heads 36 to permit relative expansion and contraction of the shaft and casing. Packing 38 is provided in each head 36 to prevent escape of lubricant from the housings. Bearings 35 radially support the outer ends of the shaft 4 in the casing. Spacing-sleeves 39 are interposed between the hubs of heads 11 and the bearing-rings of roller-bearings 24, 25 respectively. Nuts 42 are screw-threaded to the shaft 4 adjacent its ends and are adapted, through the inner bearing-rings of bearings 35, to force heads 11, sleeves 39 and rings 24 and 25 together endwise and firmly clamp them together on the shaft. Heads 11 are splined to shaft 4 so that the shaft will be rotated by the heads and to permit the heads to be clamped as aforesaid. Tubular members 43 are interposed between the central head 20 and housing-sections 29, being secured to the central head by bolts 28 and to sections 29 by screw-threaded collars 44. These tubular-members enclose the shaft-structure between head 20 and housing sections 29, and permit lubricant from the wobble-ring chambers to pass to the thrust-bearings 24, 25.

Each of the wobble-rings 8 and 9 is provided with an outwardly extending stud 46 on which is slidably mounted a sleeve with a spherical member 47 which is confined in a spherical socket 48 which is formed of sections secured together by bolts 49 and is slidable longitudinally on and fixed against radial movement by a pair of longitudinal guide-rods 50 which are parallel to the axis of shaft 4 and are fixed in the housing-sections 29, 31.

Each cylinder may be provided with a water-jacket 52. It will be understood that suitable valves and valve-operating mechanism (not shown) will be provided to control fuel or a suitable motive agent and admit it to the cylinders in rotative order so that outward power strokes will be imparted to both pistons in each cylinder simultaneously and the pairs of pistons in the cylinders will be operated in rotative or proper succession.

The operation of the engine will be as follows: The motive agent will be admitted through intake 14 in one of the cylinders 5 and will impart an outward or longitudinal power stroke to both of the pistons therein. The outward movement of these pistons will simultaneously and equalizedly act upon the wobble-rings 8 and 9 through pitmen 10 and their ball-and-socket joints, to exert an outward pressure upon the rings at longitudinally aligned points, in a direction which is substantially parallel with, and longitudinal of, the axis of the shaft 4. As a result of the oppositely moving pistons and this application of the driving stresses, the driving force applied to the wobble-rings will be exerted longitudinally of the shaft 4 and, therefore, resisted by the shaft itself and equalized so that substantially all of the power stresses will be applied without passing through the casing. The outward operation of the pitmen 10 will exert outward pressure upon the wobble-rings in opposed directions, so that the outward pressure upon one ring will be equalized or balanced by the opposed pressure against the other ring. The motive agent is admitted into and exhausted from the cylinders in rotative succession, so that the pistons in the successive cylinders will be successively operated to apply opposed equalized force to the wobble-rings at rotatively successive points and in rapid succession and causing them to wobble and drive the heads 11 to rotate the shaft 4, the rings being held against rotation by the ball-and-socket joints between them and the rods 50.

The invention exemplifies a motor in which the force of oppositely working pistons is applied longitudinally of the drive-shaft and in which the oppositely applied stresses of the pistons are substantially equalized upon the shaft and, as a result, minimum driving stresses are transmitted through the motor supporting structure or casing. This makes it possible to materially lessen the weight of the motor as a whole. The construction set forth is one which can be produced at a low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a motor, the combination of a shaft, cylinders having their axes substantially longitudinal of the shaft, opposed pistons working in the cylinders, a casing, oppositely working wobble rings on the ends of the shaft, pitmen between the rings and the pistons, a supporting structure, and a bearing secured to the supporting structure adjacent the longitudinal center of the cylinders for preventing longitudinal thrust of the shaft.

2. In a motor, the combination of a shaft, cylinders having their axes substantially longitudinal of the shaft, a casing comprising a member through which the shaft extends and to which the cylinders are secured, opposed pistons working in the cylinders, oppositely working wobble rings on the ends of the shaft, pitmen between the pistons and the rings, and a bearing secured to the member adjacent the longitudinal center of the cylinders for preventing longitudinal thrust of the shaft.

3. In a motor, the combination of a shaft, cylinders having their axes substantially longitudinal of the shaft, opposed pistons working in the cylinders, a casing, driving means between the shaft and the pistons whereby longitudinal driving stresses will be applied in opposite directions and to rotate the shaft, a central thrust bearing for the shaft, and end bearings, said end bearings being slidably mounted to permit relative expansion and contraction of the casing and shaft.

4. In a motor, the combination of a shaft, cylinders having their axes substantially longitudinal of the shaft, opposed pistons working in the cylinders, a casing, driving mechanism between the shaft and the pistons whereby longitudinal driving stresses will be applied in opposite directions and to rotate the shaft, a central thust bearing for the shaft, a pair of head members carried by the casing and extending respectively around the ends of the shaft, and ball bearings for the shaft slidably mounted in the heads to permit longitudinal expansion and contraction of the shaft.

5. In a motor, the combination of a shaft, cylinders having their axes extending longitudinal of and substantially parallel with the axis of the shaft, opposed pistons working in the cylinders, oppositely working wobble rings on the shaft, pitmen between the rings and the pistons, heads for the rings on the shaft, a central thrust-bearing for said shaft, spacing sleeves between the heads and said bearing, and means at the ends of the shaft for adjustably clamping the heads against said sleeves to hold the heads longitudinally positioned on the shaft.

6. In a motor, the combination of a shaft, cylinders having their axes substantially longitudinal of the shaft, opposed pistons working in the cylinders, oppositely working wobble rings on the shaft, pitmen between the rings and the pistons, a casing separate from the cylinders and comprising a member having a plurality of semi-circular seats in which the cylinders are respectively secured, and clamping members for rigidly securing the cylinders to said seats respectively, said clamping members being individually removable.

7. In a motor, the combination of a shaft, a series of cylinders having their axes substantially longitudinal of the shaft, opposed pistons working in the cylinders, oppositely working wobble rings on the shaft, pitmen between the rings and the pistons, a central thrust-bearing for said shaft, and a casing comprising housings for the rings respectively, and shaft enclosing members between the bearing and said housings, said enclosing members being spaced from said shaft to form passageways between the bearing and the housings.

8. In a motor, the combination of a shaft, a series of cylinders having their axes substantially longitudinal of the shaft, opposed pistons working in the cylinders, oppositely working wobble rings on the shaft, pitmen between the rings and the pistons, a central thrust-bearing for said shaft, and a casing comprising a central member to which the cylinders are secured, housings for the rings respectively, and shaft enclosing members between said bearing and the housings, said enclosing members being secured to the central member and being spaced from the shaft to form passageways between the bearing and the housings.

Signed at Chicago, Illinois, this 26th day of February, 1923.

AAGE E. WINCKLER.